(12) United States Patent
Hansen

(10) Patent No.: US 11,592,071 B2
(45) Date of Patent: Feb. 28, 2023

(54) ACTUATOR AND A BOW

(71) Applicant: BSH Industries ApS, Hørsholm (DK)

(72) Inventor: Bent Schultz Hansen, Herlufmagle (DK)

(73) Assignee: BSH Industries ApS, Hørsholm (DK)

( * ) Notice: Subject to any disclaimer, the term of this patent is extended or adjusted under 35 U.S.C. 154(b) by 180 days.

(21) Appl. No.: 17/289,120

(22) PCT Filed: Oct. 16, 2019

(86) PCT No.: PCT/EP2019/078081
§ 371 (c)(1),
(2) Date: Apr. 27, 2021

(87) PCT Pub. No.: WO2020/088936
PCT Pub. Date: May 7, 2020

(65) Prior Publication Data
US 2021/0381571 A1 Dec. 9, 2021

(30) Foreign Application Priority Data
Oct. 31, 2018 (DK) .......................... PA 2018 70705

(51) Int. Cl.
*F41B 5/14* (2006.01)
*F16F 9/32* (2006.01)
*F16F 9/02* (2006.01)
*F41B 5/10* (2006.01)

(52) U.S. Cl.
CPC .......... *F16F 9/3278* (2013.01); *F16F 9/0218* (2013.01); *F41B 5/1403* (2013.01); *F16F 2230/04* (2013.01); *F16F 2230/06* (2013.01); *F41B 5/10* (2013.01)

(58) Field of Classification Search
CPC .. F41B 5/0094; F41B 5/10; F41B 5/14; F41B 5/1403
USPC .................................. 124/23.1, 25.6, 86, 88
See application file for complete search history.

(56) References Cited

U.S. PATENT DOCUMENTS

| 3,486,495 | A | | 12/1969 | Allen | |
|---|---|---|---|---|---|
| 3,625,193 | A | * | 12/1971 | Palma | F41B 5/0073 124/23.1 |
| 3,913,556 | A | * | 10/1975 | Palma | F41B 5/0031 124/23.1 |
| 3,981,290 | A | * | 9/1976 | Islas | F41B 5/0005 124/88 |
| 4,044,859 | A | * | 8/1977 | Wallis | F16N 7/30 184/18 |
| 5,445,139 | A | * | 8/1995 | Bybee | F41B 5/12 124/25 |

(Continued)

FOREIGN PATENT DOCUMENTS

| GB | 2073077 A | 10/1981 |
|---|---|---|
| WO | 2011004125 A1 | 1/2011 |

*Primary Examiner* — Alexander R Niconovich
(74) *Attorney, Agent, or Firm* — Robinson & Cole LLP

(57) ABSTRACT

A pneumatic actuator having therein a venting element and a porous element, compression and elongation of the actuator creating an air flow in the venting element and porous element to output lubricant as a mist toward a sliding interface of the actuator. A bow using the actuator and a bow having a double string preventing sideward movement when launching an arrow. A compound bow having limbs with multiple rotatable elements and an actuator rotating such elements to launch an arrow.

1 Claim, 4 Drawing Sheets

(56) References Cited

U.S. PATENT DOCUMENTS

| | | | | |
|---|---|---|---|---|
| 5,931,146 A * | 8/1999 | Schrader | F41B 5/0052 | |
| | | | 124/23.1 | |
| 5,934,264 A * | 8/1999 | Doornenbal | F41B 5/0005 | |
| | | | 124/23.1 | |
| 6,055,974 A * | 5/2000 | Dieziger | F41B 5/10 | |
| | | | 124/23.1 | |
| 6,253,752 B1 | 7/2001 | Cox et al. | | |
| 6,786,214 B2 * | 9/2004 | Andrews | F41B 5/10 | |
| | | | 124/23.1 | |
| 7,337,773 B2 * | 3/2008 | Simo | F41B 5/143 | |
| | | | 124/44.5 | |
| 8,136,514 B2 * | 3/2012 | Howard | F41B 5/10 | |
| | | | 124/16 | |
| 8,522,762 B2 * | 9/2013 | Trpkovski | F41B 5/1453 | |
| | | | 124/900 | |
| 8,522,763 B2 * | 9/2013 | Nebergall | F41B 5/10 | |
| | | | 124/25.6 | |
| 8,689,775 B2 * | 4/2014 | Eee | F41B 5/0094 | |
| | | | 124/900 | |
| 8,789,519 B2 * | 7/2014 | Nebergall | F41B 5/10 | |
| | | | 124/25.6 | |
| 9,255,753 B2 | 2/2016 | Pulkrabek et al. | | |
| 9,273,922 B2 * | 3/2016 | Hudkins | F41B 5/123 | |
| 9,518,798 B1 * | 12/2016 | Farren | F41B 5/10 | |
| 9,810,503 B2 * | 11/2017 | Serviss | F41B 5/1426 | |
| 9,964,379 B2 * | 5/2018 | Farren | F41B 5/1403 | |
| 10,323,899 B2 * | 6/2019 | Missbach | F41B 5/1449 | |
| 10,378,852 B1 * | 8/2019 | Rotramel | F41B 5/00 | |
| 10,408,558 B2 * | 9/2019 | Thalberg | F41B 5/12 | |
| 10,724,821 B2 * | 7/2020 | Thalberg | F41B 5/14 | |
| 11,181,336 B2 * | 11/2021 | Thalberg | F41B 5/123 | |
| 11,226,167 B2 * | 1/2022 | Thalberg | F41B 5/14 | |
| 11,320,230 B2 * | 5/2022 | Thalberg | F41B 5/12 | |
| 2004/0094139 A1 | 5/2004 | Andrews | | |
| 2005/0123883 A1 | 6/2005 | Kennen et al. | | |
| 2006/0011181 A1 * | 1/2006 | Andrews | F41B 5/1426 | |
| | | | 124/23.1 | |
| 2010/0089376 A1 * | 4/2010 | Bunk | F41B 5/14 | |
| | | | 124/1 | |
| 2011/0120436 A1 | 5/2011 | Eee | | |
| 2012/0222663 A1 | 9/2012 | Nebergall | | |
| 2014/0261358 A1 * | 9/2014 | Pulkrabek | F41B 5/105 | |
| | | | 29/428 | |

* cited by examiner

ACTUATOR AND A BOW

CROSS REFERENCE TO RELATED APPLICATIONS

The instant application is a U.S. National Stage application of and claims priority to PCT/EP2019/078081, filed on Oct. 16, 2019, which is a PCT application of and claims priority to DK Application No. PA 2018 70705, filed on Sep. 15, 2018, the subject matter of both aforementioned applications are hereby incorporated by reference in their entireties.

TECHNICAL FIELD

The present invention relates to a pneumatic actuator and/or a bow and in particular to improvements of bows. One embodiment is a bow with the pneumatic actuator which increases the range of the arrow as well as the velocity and thus precision thereof. Another situation relates to a bow with a double string reducing undesired movement of the arrow during and after launch. Yet other situations relate to improved compound bows.

BACKGROUND

It is often desired that bows launch arrows/bolts with as high a velocity as possible, as this increases the accuracy of the bow.

Bows are described in e.g. U.S. Pat. Nos. 3,486,495, 9,255,753, 8,136,514, US2005123883, U.S. Pat. Nos. 5,445,139 and 6,253,752.

SUMMARY

The present invention addresses many obstacles present in the known technology. The present bow may increase the accuracy of arrows in a number of ways.

In a first aspect the present invention relates to a pneumatic actuator comprising:
a first portion and a second portion, the first portion defining a closed channel, the second portion having a part being slidably positioned in the channel, the part having an end portion positioned in the channel, the first and second portions defining an elongate compartment comprising at least a portion of the channel;
a lubricating element provided in the compartment, the lubricating element having:
 a first surface facing the first portion,
 a second surface facing the second portion,
 one or more channels extending from the first surface to the second surface and
 a lubricant in or on the lubricating element.

In the present context, an actuator is an element configured to exert a force to an element or between elements connected thereto. In a preferred embodiment, the actuator is compressible, bendable or extendable to bias the actuator, for the actuator to subsequently be able to exert an oppositely directed force between elements connected thereto.

The actuator may be manually energized or tensioned so that the actuator may be used without any other power source.

The first portion defines a closed channel. Preferably, the channel is closed at one end by the first portion and at the other end by the second portion. The channel may have the same cross section along at least a portion of its length, such as a portion thereof engaged or engageable by the second portion.

Alternatively, the second portion may have an outer side with the same cross section for a length thereof introducible into the first channel, so that a part of the first portion engaging the second portion may form a sealed connection while the second element is translated into and out of the first channel.

The second portion may travel inside the channel as a piston in a cylinder.

The end portion of the second portion may be the portion of the second portion extending the farthest into the channel. The end portion may be engaging the channel and thus form a seal between the channel wall and the second portion.

A sealing element may be provided between the first and second portions, or the end portion may perform this sealing, so that the compartment is air tight or at least substantially air tight. Then, a reduction in the volume of the compartment will increase an air pressure in the compartment acting to force the second portion outwardly of the channel again. Naturally, the degree of sealing will depend on the use of the actuator.

In fact, the actuator may have, even in its most expanded state, a pressure exceeding 1atm therein, such as a pressure of 20 bar or more, such as 40 bar or more, such as 50 bar or more, such as 60 bar or more, such as 70 bar or more, such as 80 bar or more, such as 100 bar or more, such as in the interval of 10-120 bar, such as in the interval of 50-120 bar, such as in the interval of 80-120 bar. Then, an element may be provided preventing the second and first parts from disengaging and releasing the air pressure.

Presently, it is desired that the sealing allows a pressure of 60 bar, such as 80 bar, such as 100 bar may be maintained in the actuator for at least 2 hours, such as 12 hours, such as 1 day, such as 2 days, such as 4 days, such as 5 days.

The actuator may comprise a valve for introducing air into or removing air from the compartment as well as safety or overpressure valves or the like.

The compartment is defined by a portion of the channel, such as a portion of the channel delimited by the second portion. The compartment may, naturally, extend also into the second portion. Thus, the "piston" may be hollow or itself have a channel extending in the same direction or along the same axis as the channel of the first portion.

When the second and first portions move in relation to each other, the size and volume of the compartment changes.

A lubricating element is provided having one or more channels which extend from the first to the second sides, so that air or gas may travel from one portion of the compartment defined partly by the first surface, through the lubricating element and to another portion of the compartment defined partly by the second surface. The channels may extend generally along a longitudinal direction of the compartment (direction of relative movement of the first portion in relation to the second portion) but may be meandering inside the lubricating element. The size, number and degree of meandering of the channels may be selected, as these parameters will define how much air/gas can penetrate the lubricating element per unit of time. If a swift action is desired of the actuator, this amount of air/gas may be desired rather high.

The lubricating element is provided in the compartment and divides the compartment into two end volumes each defined on either side of the lubricating element and along the direction of the compartment.

The lubricating element may be a monolithic or single element, such as if made of a solid element of plastics, polymer, metal, alloy, composite element or the like. The channels may be inherent in the material, such as if the material is made from compressed, such as sintered, powder, or may be made in the material, such as by drilling or the like.

Alternatively, the lubricating element may be made from a number of elements, such as a large number of fibres which are interconnected, such as glued, adhered or sintered, to form a porous element.

When the first portion moves in relation to the second portion, not only does the overall volume of the compartment change, also the volumes of the end volumes change. Thus, air or gas flow takes place between the end volumes through the lubricating element.

In one embodiment, the lubricating element seals or at least substantially seals the compartment so that air/gas flow from one end volume to the other takes place via the channels. To this effect, a sealing element may be provided. In another embodiment, one or more larger openings may be provided in the lubricating element to allow a higher gas/air flow there through in order to increase the speed with which the actuator may act.

Any number of channels may be used, such as 1, 2, 5, 8, 10, 20, 30 or more. In an element of sintered or compressed powder or fibres, the number may be much higher, often thousands.

In one element, the lubricating element is made of two elements: a venting element comprising one or more air ducts extending generally in a longitudinal direction of the compartment and
 a porous element comprising the lubricant, wherein, the porous element is positioned adjacent to openings of the air ducts and closer to the end portion than the venting element.

The porous element may have a thickness of at least ½ mm, such as at least 1 mm, such as at least 2 mm. A diameter of the porous element may be chosen as desired, such as 1-10 cm, such as 1-8 cm, such as 1-5 cm.

Any type of material may be used for the lubricating element, the venting element and/or the porous element, such as aluminum, carbon, carbon fibers, steel, stainless steel, titanium or more complex materials, such as chromed materials or combination of such material. Naturally, the strength and weight may be taken into account in addition to e.g. surface properties. Chromed surfaces, for example, may be desired for providing wear resistant surfaces.

Then, the channels are formed partly by the ducts and partly by the porosity. Preferably, the ducts extend generally in a longitudinal direction of the compartment.

The porous element, which has an open porosity, is positioned adjacently to openings of the air ducts and, as it is porous, also has therein air ducts or passages, interconnected voids, pores, or channels to allow air flow there through from the venting element to the end volume adjacent to the porous element. The porous element preferably has a large number of air ducts or openings, so that air received from the air ducts may be distributed in the porous element and be output from a large number of openings. A porous element may be made of e.g. compressed powder, cork, sponge, pumice stone, a weave, non-woven, or similar, such as felt, fleece or the like.

The porous element may abut the venting element such as if attached to the venting element in order to ensure that the air flow from the air ducts enters the porous element.

The thickness and width of the porous element will depend on the porosity, the type and e.g. flow characteristics of the lubricant etc.

The lubricating element comprises a lubricant. The lubricant may be a liquid lubricant or a powder lubricant. An air flow through the channels will force at least a part of the lubricant out of the channels, such as the porous element, and into the end volume adjacent to the lubricating element, This lubricant may simply flow out of the lubricating element or may, if the air flow is sufficiently high, be emitted as a lubricant mist which may settle on inner surfaces of the first and/or second portions defining the end volume adjacent to the lubricating element.

When the lubricating element is close to the end portion, air flow into and through the lubricating element will output lubricant also toward the end portion and thus to an interface between the first channel and the second portion and/or area where the first and second portions touch or engage. When the lubricating element comprises a porous element, this element preferably is closer to the end portion than the venting element.

An air flow through the lubricating element is obtained when the relative volume changes of the two end volumes differ. For example, if one end volume, when the compartment is reduced in volume, is reduced to 50% of its initial volume, and the other end volume is reduced to 90% of its initial volume, the gas pressure in the first end volume is larger than that in the other end volume—causing an air/gas flow.

The lubricating porous element may move in relation to any of or both of the first and second portions.

In one embodiment, the lubricating element is fixed, directly or indirectly, to the first portion. Thus, the lubricating element will move in relation to the second portion, when the second portion is moved in relation to the first portion. This attachment may be a direct attachment to a portion of the channel which the second element does not engage during normal operation.

In another embodiment, the lubricating element is fixed to the second portion. The second portion, or a part thereof, moves inside the channel, so that a fastening to the second portion is rather simple, such as a fastening to or inside a channel, if provided, of the second portion.

An elongated element may be attached to an end of the elongate compartment, and thus to one of the first and second portions, and to the lubricating element.

It is noted that the total volume of an end volume need not be directly defined by that of a portion of the compartment. The overall volume of the compartment may be determined by other parameters such as maximum diameter/volume thereof as well as the maximum desired translation of the first portion in relation to the second portion. One or both of the first and second portions may have additional air/gas reservoirs in fluid connection with the inside of the compartment. Preferably, such connection is at the end of a first/second portion the farthest from the other of the first/second portion so as to not affect the translation of the first portion in relation to the second portion.

In this manner, the flow connection between the compartment and an air/gas reservoir clearly may also affect the operation of the actuator, as the amount of gas/air which can pass from the reservoir to the compartment or vice versa per unit of time may be set to determine an overall operation of the actuator.

Naturally, the volumes of the end volumes will change when the actuator is compressed or extended. However, it may be desired that one end volume is no less than 5 times, such as no less than 7 times, such as no less than 10 times the other end volume. Also, if the larger end volume comprises a gas/air reservoir, it is desired that a flow connection from the reservoir to the compartment has a cross section of no less than 5%, such as no less than 10%, of a cross section of the compartment perpendicular to the longitudinal axis and in that end volume. In this manner, there will be no significant delay in pressure equalization between that portion of the compartment and the reservoir. Clearly, a delay may be desired, such as if the actuation is desired slower. Such a delay may be obtained by a more narrow or longer flow connection between the reservoir and compartment.

Another aspect of the invention relates to a method of operating the actuator according to the first aspect of the invention, the method comprising:
translating the second portion, in relation to the first portion, from a first position to a second position in a first direction along the longitudinal direction,
translating the second portion, in relation to the first portion, from the second position to the first position in a second, opposite direction along the longitudinal direction.

This translation may be a compression or an extension of the actuator by moving the second portion further into or out of the channel in the first portion.

In one situation, a velocity of the movement in the first direction is higher than a velocity of the movement in the second direction. This may be the situation if, e.g., the actuator is energized or biased to be ready to release the collected energy at a later point in time, such as as fast as possible. Below, a bow incorporating such actuators is illustrated, where the actuator is biased in one direction by the pulling of the string and is allowed to release this energy, when the string is released.

In fact, the actuator may be naturally biased toward one of the directions, such as by providing therein an over pressure (actuator biased toward expansion) or a reduced pressure (actuator biased toward contraction), where the faster movement then may be in the direction of the natural bias.

Preferably, a gas flows through the lubricating element during at least one of the translating steps, such as during both translating steps.

Preferably, the gas flow caused by the higher velocity is a gas flow through the lubricating element, such as from the venting element toward and through the porous element. This velocity, together with parameters of the gas flow, the lubricating element and the lubricant may be so that a lubricant mist is emitted into the end volume at the lubricating element.

The actuator may be used as a shock absorber. Thus, the flow through the lubricating element may be adapted to this use. The flow may be desired lower when acting as a shock absorber than when used for receiving and exerting a force such as when used in a bow. Also, the volumes below and above the lubricating element may be selected, as the pressure increase upon compression and the amount of air/gas transported through the lubricating element may be chosen differently in the two situations.

A third aspect of the invention relates to a bow having a first and second extreme portions and a double string comprising:
a first string having a first end, a second end and a central portion,
a second string having a first end, a second end and a central portion and
an interconnecting element,
wherein
the first and second ends of the first string are attached to the first extreme portion,
the first and second ends of the second string are attached to the second extreme portion and
the interconnecting element is slidably attached to the central portions of the first and second strings.

A bow may be any type of bow, such as a long bow a recurve bow, a compound bow, a cross bow or the like, where an arrow, bolt or similar elongate projectile is launched by a string biased in the opposite direction of the launch direction.

The extreme portions of a bow usually are the outer, opposite portions thereof. Such portions may have means for engaging the string, such as grooves or holes. Some bows have more intricate elements, such as cams having therein grooves for receiving and controlling the string.

The present string is formed by two strings each having a first and a second end and a central portion. The central portion is positioned between the ends but not necessarily directly centered between these.

The ends of the strings are attached to the extreme portions. Naturally, the strings may be longer, so that portions thereof extend away from the extreme portions. For example, in compound bows, the string will extend over the cam of one limb and back toward the other limb. However, functionally, the ends are those contacting the extreme portions.

The interconnecting element is slidably connected to the strings, so that each string may have a U-shape having the legs toward the pertaining extreme portion and the interconnecting element at the bottom. Then, one portion of a string (one leg of the U) is looser than the other, the slidable engagement will allow the two portions to obtain the same tension.

This is the situation for both strings and thus for all portions of the strings between the two extreme portions.

The slidable connection or attachment may be obtained having a string extend through a simple hole or channel in the interconnecting element. Thus, the interconnecting element may comprise at least one hole through which a central portion of the first or second string extends.

More intricate manners may be used where the string engages a rotatable wheel of the interconnecting element.

An advantage of the double string is that the string is less prone to sideward movement when launching an arrow.

In one embodiment, the first and second extreme portions each comprises a rotatable cam, wherein both the first and the second ends of both strings engage the extreme portions of the bow via the cams, the cams having double grooves configured to accept the ends of the strings. Such cams often are rotatably attached to the remainder of the bow, such as spring biased in one direction opposite to the direction of rotation caused by drawing of the string away from a handle portion of the bow.

In one embodiment, the interconnecting element is at least generally U- or V-shaped having two legs and a center part, engages each of the central portions at a respective leg and has means for engagement of an arrow at the center part.

Naturally, this aspect of the invention may be combined with any of the other aspects, embodiments and features of the invention, as may the other aspects/embodiments and features.

Another aspect of the invention relates to a bow comprising a frame and a string, the string being connected to the frame via two cams being positioned at opposite ends of the frame, the frame comprising:

a central portion having two extreme portions, a first portion and a second portion, each portion having a first end and a second end, each portion being rotatably attached, at its first end, to or at an extreme portion of the central portion, each of the cams being attached to or at the second end of one of the first and second portions of the frame, at least two pneumatic actuators, of which one is positioned between the central and first portion, and another one is positioned between the central and second portion.

Again, a bow may be any type of product or instrument useful for launching a projectile, such as an elongate arrow/bolt or the like by pulling the string in the opposite direction and allowing the string to launch the arrow/bolt when it is released.

The bow has a central portion and two portions to which the cams are attached. The portions are rotatably attached to the central portion, and each portion has an actuator.

The actuator preferably is an actuator which may be compressed or extended and which therein has a compartment with an air pressure increasing or decreasing due to the compression/extension and which may exert an opposite movement or force when allowed to do so. This actuator may be that according to the first aspect of the invention.

The actuators preferably are attached to the central portion and the first/second portion and are affected when the pertaining portion is rotated in relation to the central portion. Preferably, the actuator is naturally biased in a direction where the first/second portion is rotated away from the string and/or in a manner so as to tension the string.

In one embodiment, the pneumatic actuators are configured to be energized (such as when compressed or extended) when the respective portion is rotated, in relation to the central portion, in a direction toward the string, such as when the string is pulled away from the central portion. This received energy may then be output to cause a rotation in the opposite direction.

In one embodiment, each actuator is connected to its respective first/second portion at a position between an axis of rotation between the respective portion and the central portion and a position of attachment of the respective portion and its cam. In this manner, the movement caused by the actuator is amplified due to the difference in distance from the point of rotation to the point of engagement of the actuator and the distance from the point of rotation to the point of engagement of the string. This difference in distance may be seen as a gearing of the movement of the actuator to the movement of the cam and thus the string.

In one embodiment, the central portion comprises a first and a second intermediate element and a central element having two outer ends, each intermediate element being connected, at one end thereof, to an outer end of the central element and, at its other end, rotationally connected to a respective first/second portion, the actuators being connected to a respective intermediate element, where the intermediate elements are detachably attached to the central portion.

When each intermediate element is rotatably connected to one of the first/second portions and the actuator is connected to these elements, this assembly, which may be called a limb of the bow, may be removed altogether from the central element. The bow thus may be reduced in size and more easily transported. Also, such limbs may then be re-used or attached to another type of central element, such as an element having other dimensions or other capabilities (having other aiming instruments, other handles or the like). In fact, the same limbs may be used both on a compound bow and a cross bow.

In addition, the limbs may be locked in an actuated position, such as in a position in which the actuators are compressed so that the distance between the cams is reduced. In this manner, the string may be easily removed and replaced. This locking may be a locking of the relative intermediate element and extreme element in the desired angle.

Assembly of the bow may then be the re-attachment of the limbs to the central element and the re-placing of the string, where after the locking of the limbs is removed, preparing the bow for action. The locking may simply be achieved by bringing the limbs to the desired angle, such as by pulling the string of the bow, where after a bolt is positioned in corresponding holes of the elements of the limbs locking the limbs in that angle. The removal of the locking may then be, after attaching the limbs to the central element, pulling the string to relieve the tension on the bolts which may then be removed such as by orientating the bow in the horizontal plane so that the bolts drop out of the holes by the action of gravity.

In general, when two actuators are used in a bow, it is desired to ensure that both actuators exert the same force on the string. This may be obtained by supplying pressurized air to both actuators, such as using a T-shaped tube from a pump to the two actuators.

A final aspect of the invention relates to a bow comprising:

a central portion having two extreme portions, first and second inner elements each having a first and a second end, each of the first ends being rotatably connected to an extreme portion of the central portion, first and second outer elements each having a first and a second end, each of the first ends of the outer elements being rotatably connected to a second end of the inner elements, a first and a second actuator, the first actuator acting between the central portion and the first outer element, at a first position thereof between the ends thereof, and the second actuator acting between the central portion and the second outer element, at a second position thereof between the ends thereof, a first and a second non-extendable element the first non-extendable element acting between the central portion and the first outer element, at a third position between the ends of the first outer element and being different from the first position, and the second non-extendable element acting between the central portion and the second outer element, at a fourth position between the ends of the second outer element and being different from the second position.

a string extending between the second ends of the outer elements.

Again, the above bow definition would be suitable in this respect.

The inner elements are rotatably connected at one end to the central portion and at the other end to the outer elements. The string extends between the second ends of the outer elements. Naturally, cams or the like may be provided at the second ends of the outer elements to arrive at e.g. a compound bow.

The actuators may be of any type, such as springs, pneumatic actuators, hydraulic actuators or the like. Preferably, the actuators are of the type according to the first aspect of the invention.

Each actuator is connected to the central portion and the pertaining outer element. The actuator acts on the outer element at a first position or second position, respectively, thereof between the ends thereof.

A non-extendable element is an element which is not extended to any significant degree by the action of the actuator and/or the normal operation of the bow. Thus, the non-extendable element defines and maintains a predetermined distance between the central portion and the pertaining outer element, or rather the positions or portions thereof to which the non-extendable element is attached. This attachment preferably is a rotational attachment.

The non-extendable element may be a stiff element, such as a metal element (such as a rod), a wire or the like.

The non-extendable elements engage the outer elements at the third and fourth position, respectively, which are different from the first/second positions. When the outer elements are engaged at different positions, such as different longitudinal positions between their ends, the action of the actuator will affect a movement, such as a rotation or a more complex movement, of the second end and thus the string, due to the action of the non-extendable element.

Preferably, the first and second positions correspond to each other, such as with the same distance from one end or both ends of the outer elements. Preferably, the third and fourth positions are corresponding, such as with the same distance from one end or both ends of the outer elements.

In one embodiment, the third and fourth positions are closer to the first ends of the outer elements than the first/second positions. Thus, a gearing may be seen where the movement caused by the actuator and that seen at the second ends of the outer elements.

In one embodiment, two cams are provided and positioned one at each second end of the outer elements, the string extending between the cams. Thus, the bow may be a compound bow.

In one embodiment, the central portion comprises a first and a second intermediate element and a central element having two outer ends, each intermediate element being connected at one end thereof to an outer end of the central element and, at its other end, rotationally connected to one of the inner portions, the and non-extendable elements and actuators being connected to a respective intermediate element, where the intermediate elements are detachably attached to the central portion. Thus, the assemblies of the intermediate, inner and outer elements and further comprising the actuators and non-extendible elements, such assemblies may be called limbs of the bow, may be detached from the central element, so that the bow may be reduced in dimensions and thus more easily transported.

In a particularly interesting embodiment, the bow further comprises a locking element for locking the first inner element in a predetermined rotational position in relation to the first outer element. In this manner, the actuator may be locked in a biased state so that the string may be replaced or, in the above situation, the limbs may be removed in a state where the string is not tensioned.

BRIEF DESCRIPTION OF THE DRAWINGS

In the following, preferred embodiments of the drawings will be described, wherein.

DETAILED DESCRIPTION

Figure 1:
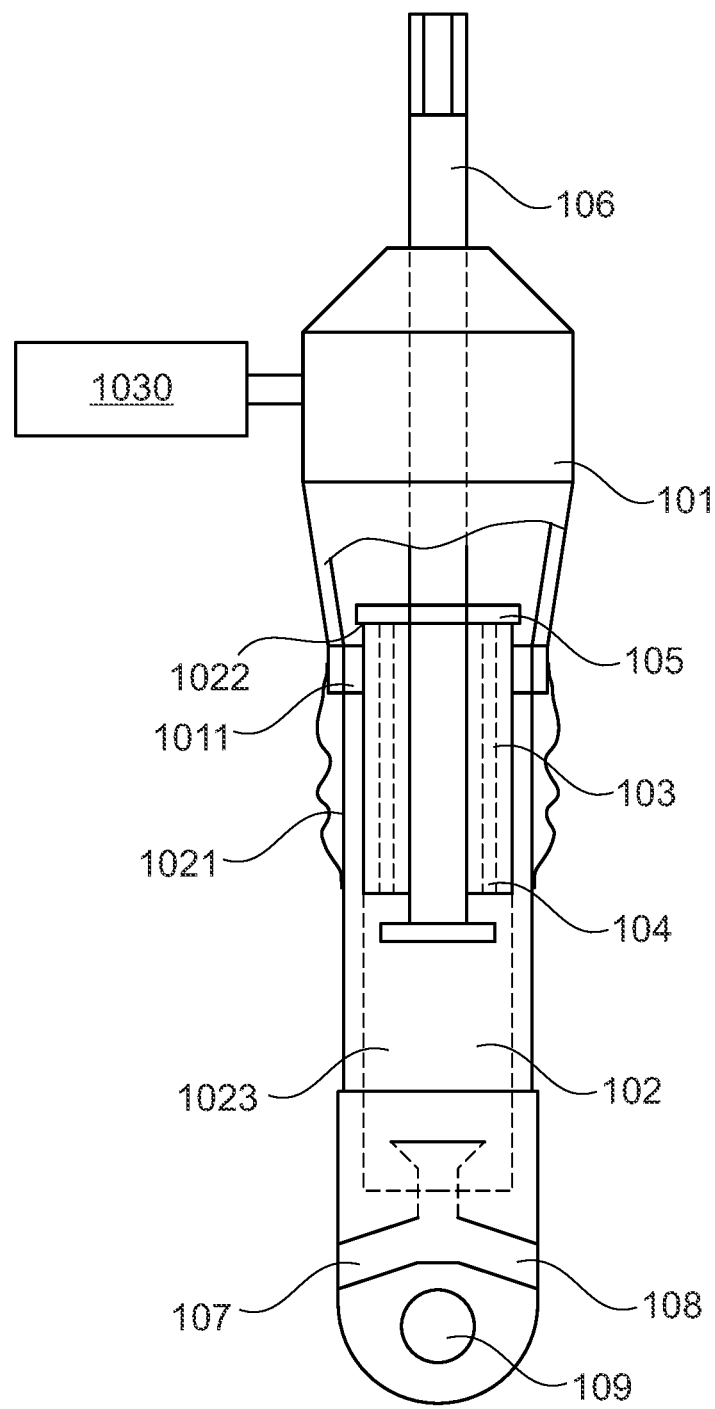
FIG. 1 illustrates a pneumatic actuator.

FIG. 1 illustrates a pneumatic actuator 100. The actuator comprises a first portion 101 and a second portion 102. The first portion 101 defines a closed first channel 1011 while the second portion 102 has a part 1021 being slidably positioned in the first channel 1011 of the first portion. The part 1021 of the second portion has an end portion 1022 which slides along the first channel 1011. The actuator further comprises a venting element 103 comprising one or more air ducts 104. The venting element may be either stationary element or it may slide along the channel of the first portion or inside a second channel 1023 of the second portion 102. FIG. 1 illustrates the venting element with its major part positioned within the second channel 1023.

Only a part of the venting element is within the first channel. A remainder of the venting element is in the second channel. The air ducts 104 are extending generally in a direction of the channels. The air ducts extend along the longitudinal direction of the entire venting element. Above the venting element 103 is a porous element 105 comprising a lubricant. A porous element may be a material with interconnected voids, pores, or channels, such as a compressed powder, cork, sponge, pumice stone, a weave, non-woven, or similar, such as felt, fleece or the like.

As the porous element 105 is positioned adjacently to openings of the air ducts, and closer to the end portion 1022 than the venting element 103, air passing through the air ducts will also pass through the porous element and cause at least a part of the lubricant to be forced out of the porous element, such as a lubricant mist, to lubricate the walls of the channel of the first portion and thus an interface between the first and second portions. The pneumatic actuator further comprises a guide pin 106 which may serve as a fixture of the actuator 100 to another element. The actuator 100 can be disassembled and the guide pin 106 can limit the movements of the first and second portion during disassembly. The bottom part of the actuator has a safety valve port 107 and a load valve port 108. A loop 109 is provided for fixing another element to the actuator opposite to one connected the guide pin 106.

The operation of the lubrication of the actuator is that during compression, an upper volume above (in the drawing) the venting element and porous element will change, as will a lower volume below the venting element. Thus, air transport through the venting element/porous element is required to equal the pressures in the two volumes.

The same will be the situation when the actuator is again extended, such as released, so that the volumes normalize. Naturally, the actuator may be used equally well for initial extension (generate vacuum or a lower pressure) or an initial compression (increase pressure therein).

The air transport through the venting element and porous element thus will affect the lubricant in the porous element. Preferably, the air transport in a direction from the venting element toward the porous element is higher than that in the opposite direction, so that the overall lubricant transport is out of the porous element and into the upper chamber in the drawing.

Thus, the venting element and porous element may move, relative to the first and/or second portion, during compression/expansion. Alternatively, they may be fixed to one of the first or second portions.

Preferably, the porous element is positioned closer to the end portion 1022 when the lubricant is emitted, so that the lubricant accesses the interface between the first and second portions.

Therefore, the venting element may, in the drawing, be positioned over the porous element, if these are then provided higher than the end portion 1022.

Naturally, the size of the volumes above and below the venting element and porous element may be adapted by adapting the first and second portions as may the interface between the first and second portions so that the volume change above and below the venting element and porous element are as desired.

The position of the venting element and porous element may be selected from the expected velocity of the expansion/compression. Preferably, one of the expansion and compression takes place faster than the other, so that the air or gas transport through the venting element is faster in one direction than the other. Preferably, the porous element is positioned at the end of the venting element outputting the air/gas with the higher velocity, as this has the best opportunity to generate a lubricant mist.

The lubricant preferably is a liquid or fluid with flow characteristics allowing it to enter the porous material. Thus, the porous material preferably is of a type having openings/pores and surface characteristics allowing the lubricant to enter into the porous material.

Alternatively, the porous material and lubricant may be selected so that the lubricant does not enter or does not to any significant degree enter the porous element. This may be due to the lubricant having a low viscosity or a large particle size and/or the porous element having small openings at its upper side or being made of a material repelling the lubricant. In this situation, it is preferred that the lubricant does not travel through the porous material and into the venting element.

Clearly, the venting element and porous element may be replaced by a single element having an open porosity or channels therein.

Also illustrated is a air/gas reservoir 1030 connected via a flow connection to the end volume above the porous element 5, thus effectively increasing that volume without changing the overall relative properties of the first and second portions. The volume of the reservoir and the size of the flow channel will take part in the definition of the flow inside the actuator upon compression or expansion.

Figure 2:
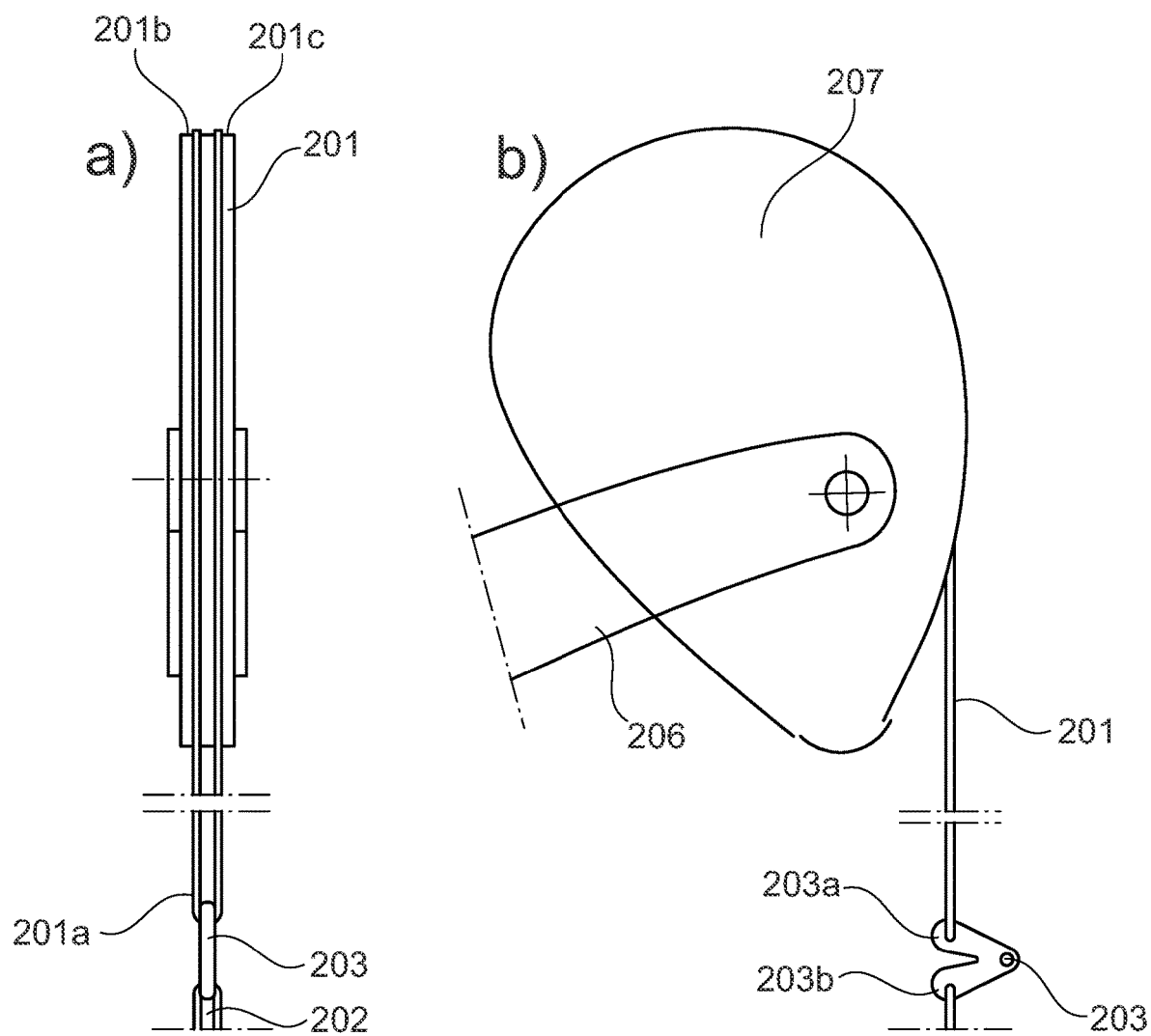
FIG. 2 illustrates a double string for a compound bow.

FIG. 2 illustrates a double string for a bow. FIG. 2a illustrates a front view of the double string configuration while FIG. 2b illustrates a side view of the double string provided on a cam as is usual in compound bows. The double string comprises a first string 201, a second string 202 and an interconnecting element 203. The interconnecting element may be made of aluminium, metal, alloy, plastics, polymers, steel, leather or similar. Only a part of the second string is illustrated in both FIGS. 2a and 2b. However, it is preferably symmetrical to the first string. The interconnecting element 203 has an upper portion 203a and a lower portion 203b. The central portion of the first string 201a is slidably connected to the upper portion 203a of the interconnecting element and the central portion of the second string is connected to the lower portion 203b of the interconnecting element. Free ends of the first string, 201b and 201c, are connected to the bow, such as the cams of a compound bow.

When used with a compound bow, the double string could be received in double grooves in the cams.

The advantage of the double string is two-fold. Firstly, the two parallel strings will counter-act sideward movement (in FIG. 2a) of the string during launching of an arrow.

The dividing of the double string using the slidable connection of the interconnecting element allows the two strings (the four half-strings) to be equally tensioned. If, e.g. (FIG. 2a) the right string was more loose than the left string, the strings would rotate during launching of the arrow, naturally affecting the delivery and flight of the arrow.

The slidable connection may be a simple hole through which the pertaining string extends and is allowed to slide along the string. Naturally, a more complex solution may be chosen where the string extends on a wheel, cam or the like rotatably connected to the interconnecting element.

The interconnecting element may be V-shaped so that the strings may be connected to the arms and an archer may engage the interconnecting element at the bottom of the V. An arrow may be engaged by an element extending inside the V-shape.

A double string may be used on any type of bow, long bows, recurve bows, compound bows, cross bows or the like.

Figure 3:
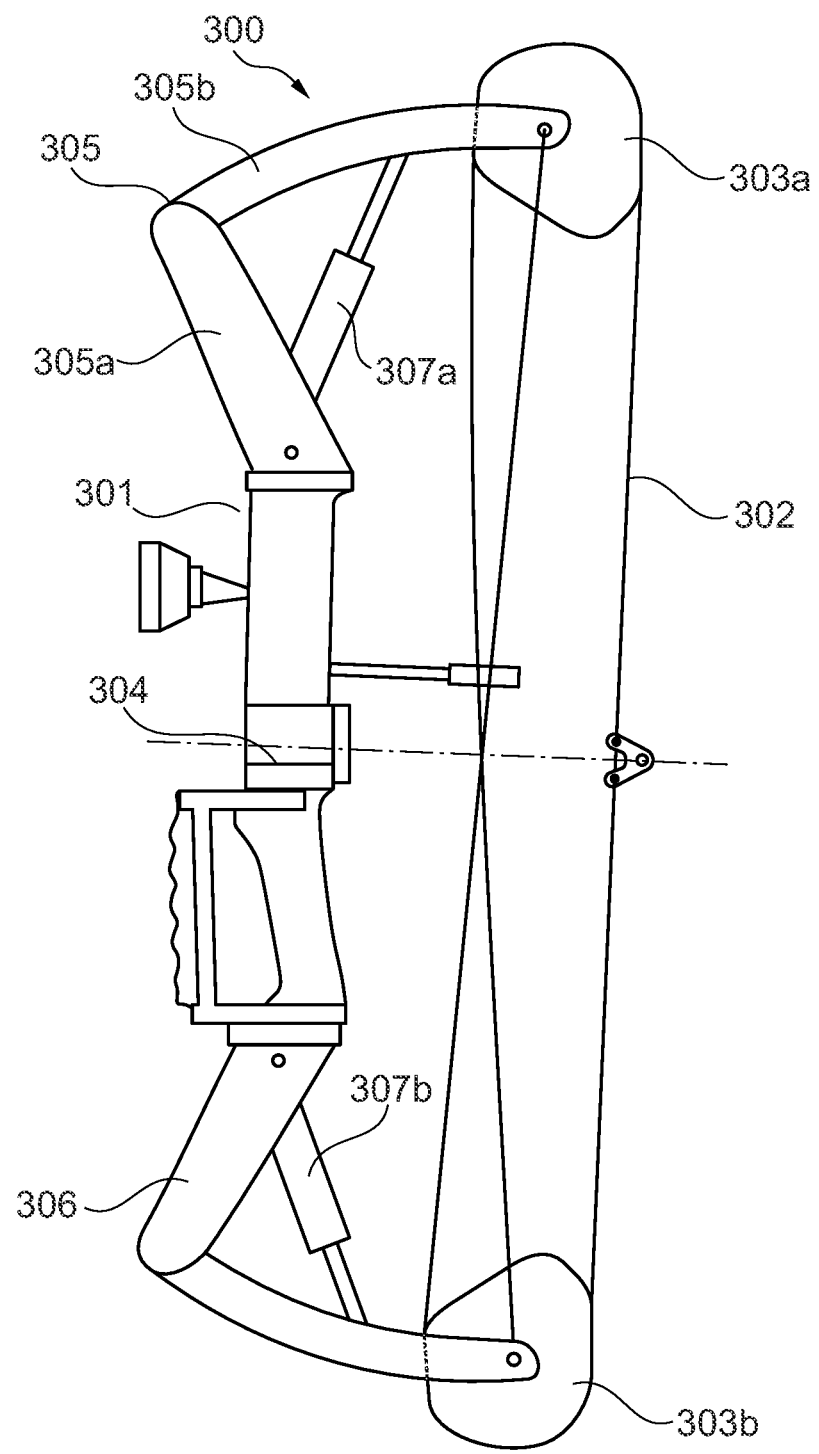
FIG. 3 illustrates a compound bow.

FIG. 3 illustrates a compound bow 300. The bow comprises a frame 301 and a bow string 302. The bow string 302 is connected to the frame via two cams 303a and 303b which are positioned at ends of the frame 301. The frame comprises a central element 304, a first limb 305 and a second limb 306. The first and second limbs are preferably detachably attached to the central element 304. Alternatively, a central portion may be formed by the central element and the intermediate parts also.

The cams 303a and 303b are attached to the outer ends of the first and second limbs. The cams have grooves configured to accept the bow string 302.

Each limb has an intermediate part 305a and an outer part 305b rotatably attached to each other. The intermediate part is detachably or permanently attached to the central portion and the outer part is rotatably attached to one of the cams.

The frame further comprises two pneumatic actuators 307a and 307b, each being positioned between the intermediate and outer parts of a limb. The actuators may be of the type illustrated in relation to FIG. 1. However, also other types of actuators, such as springs, hydraulic actuators or the like may be used.

Clearly, when the string 302 is pulled back, the cams are rotated and the outer parts rotated in relation to the intermediate parts, thus compressing the actuators.

In addition to the spring tensioning of the cams and thus release thereof when they are allowed to rotate back to their initial rotational positions, when the string is released, the actuators will act to rotate the intermediate/outer parts of the limbs back to the initial positions. It is seen that an even larger effect is achieved due to the "gearing" obtained due to the distance between, on the one hand, the axis of rotation between the intermediate and outer parts and the point of attachment of the actuator on the outer part and, on the other hand, the point of attachment of the actuator on the outer part and the position of engagement of the string and the cam.

It may be desired to be able to dis-assemble the bow, such as when the intermediate parts and the central element may be detached from each other or if the string is desired removed/replaced. Thus, it may be desired to be able to lock the actuator in a compressed state. Many manners of obtaining this exist, such as providing the actual actuator with a system preventing it from expanding from a compressed position. Preferably, an element is provided for locking the intermediate part in a desired angle in relation to the outer part. This may be a simple bolt extending through corresponding holes in the intermediate part and the outer part, when the angle is provided. Providing the angle may simply be pulling the string. Having obtained the angle, the bolts may be inserted, where after the string may be relaxed or even removed and the limbs may be detached from the central element. Re-attachment is simple, and the bow may then be made operational by again pulling the string, relaxing the forces acting on the bolts which may then be removed.

Figure 4:
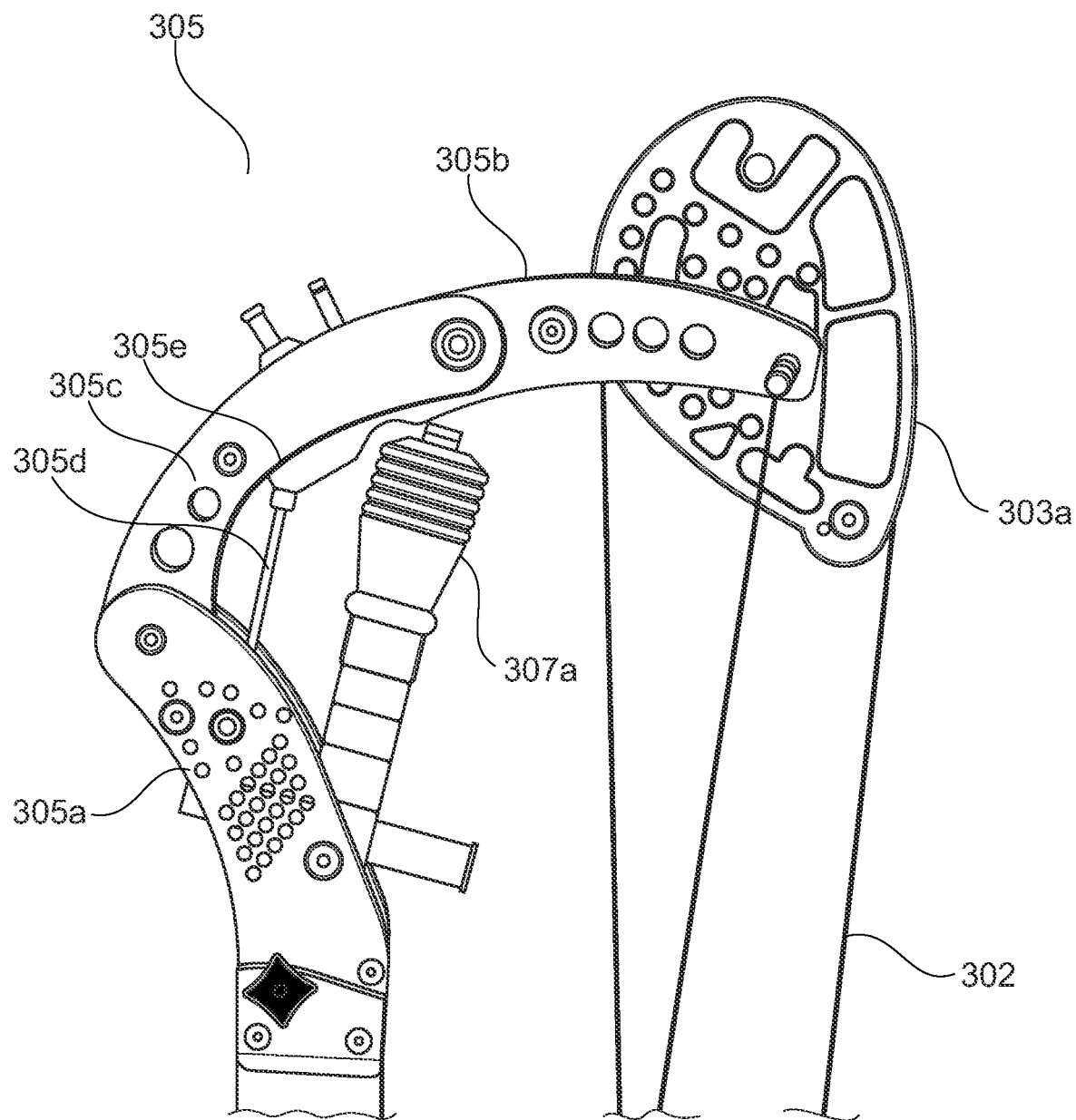
FIG. 4 illustrates a first embodiment of a limb of a compound bow.

In one embodiment, seen in FIG. 4, an inner element 305c is provided between the intermediary part 305a and the outer part 305b. The inner element 305c is rotationally connected to each of the intermediary part 305a and the outer part 305b.

In addition, a non-extendable element 305d, such as a wire, rope, rod or the like, is provided between the outer part and the intermediary part. The actuator 307a is attached to the outer part at a position between the attachment positions of the cam 303a and the non-extendable part, respectively. In this embodiment, the actuator is attached to the outer part at the rotational connection between the outer part and the inner part. This, however, is not a requirement.

It is seen that now the "gearing" of the cam axis or the point of contact between the string and the cam, compared to the intermediary portion, is defined by the relative positions of the attachment positions of the outer element to the actuator and the non-extendable element, respectively.

In this situation, rotation may be locked between the outer part and the inner part, as this can lock the actuator in e.g. a compressed state. One manner of obtaining this rotational locking is to lock the outer part to the inner part, such as at a position away from the rotational attachment between these elements—such as at a position 305e at the end of the outer part the farthest from the cam. Locking the outer part to the inner part when the actuator is compressed would lock the inner, outer and intermediate parts and the actuator in a predetermined configuration, where after this assembly may be disengaged from the central element if desired and/or the string may be removed. In fact, the limbs may be attached to e.g. another central element with other capabilities, such as with another handle, other aiming means or to form another type of bow, such as a cross bow.

The above aspects and technologies may be combined to form different types of products, such bows, compound bows, recurve bows, long bows, cross bows or the like.

What is claimed is:

1. A bow comprising a frame and a string, the string being connected to the frame via two cams being positioned at opposite ends of the frame, the frame comprising:
    a central portion having two extreme portions,
    a first portion and a second portion, each of the first and second portions having a first end and a second end, each of the first and second portions being rotatably attached, at its first end, to or at an extreme portion of the central portion, each of the cams being attached to or at the second end of one of the first and second portions of the frame,
    at least two pneumatic actuators, of which one is positioned between the central and first portion, and another one is positioned between the central and second portion,
    wherein the central portion comprises a first and a second intermediate element and a central element having two outer ends, each intermediate element being connected at one end thereof to an outer end of the central element and, at its other end, rotationally connected to a respective first or second portion, the actuators being connected to a respective intermediate element, where the intermediate elements are detachably attached to the central portion, and
    locking means configured to fix the first intermediate element in a predetermined angle to the first portion and the second intermediate element in a predetermined angle to the second portion.

\* \* \* \* \*